United States Patent
Im et al.

(10) Patent No.: US 8,378,947 B2
(45) Date of Patent: Feb. 19, 2013

(54) SYSTEMS AND METHODS FOR TEMPORAL SUBPIXEL RENDERING OF IMAGE DATA

(75) Inventors: Moon Hwan Im, Cupertino, CA (US); Thomas Lloyd Credelle, Morgan Hill, CA (US); Mathew Osborne Schlegel, Palo Alto, CA (US)

(73) Assignee: Samsung Display Co., Ltd. (KR)

( * ) Notice: Subject to any disclaimer, the term of this patent is extended or adjusted under 35 U.S.C. 154(b) by 900 days.

(21) Appl. No.: 11/462,979

(22) Filed: Aug. 7, 2006

(65) Prior Publication Data

US 2007/0052721 A1 Mar. 8, 2007

Related U.S. Application Data

(63) Continuation of application No. 10/379,767, filed on Mar. 4, 2003, now abandoned.

(51) Int. Cl.
G09G 5/00 (2006.01)
(52) U.S. Cl. .......................... 345/98; 345/589
(58) Field of Classification Search .................. 345/589, 345/98
See application file for complete search history.

(56) References Cited

U.S. PATENT DOCUMENTS

| | | |
|---|---|---|
| 3,971,065 A | 7/1976 | Bayer |
| 4,353,062 A | 10/1982 | Lorteije et al. |
| 4,439,759 A | 3/1984 | Fleming et al. |
| 4,593,978 A | 6/1986 | Mourey et al. |
| 4,642,619 A | 2/1987 | Togashi |
| 4,651,148 A | 3/1987 | Takeda et al. |
| 4,751,535 A | 6/1988 | Myers |
| 4,773,737 A | 9/1988 | Yokono et al. |
| 4,786,964 A | 11/1988 | Plummer et al. |
| 4,792,728 A | 12/1988 | Chang et al. |
| 4,800,375 A | 1/1989 | Silverstein et al. |
| 4,853,592 A | 8/1989 | Stratham |
| 4,874,986 A | 10/1989 | Menn et al. |
| 4,886,343 A | 12/1989 | Johnson |
| 4,908,609 A | 3/1990 | Stroomer |
| 4,920,409 A | 4/1990 | Yamagishi |
| 4,946,259 A | 8/1990 | Matino et al. |
| 4,965,565 A | 10/1990 | Noguchi |
| 4,966,441 A | 10/1990 | Conner |
| 4,967,264 A | 10/1990 | Parulski et al. |
| 5,006,840 A | 4/1991 | Hamada et al. |
| 5,010,413 A | 4/1991 | Bahr |

(Continued)

FOREIGN PATENT DOCUMENTS

| | | |
|---|---|---|
| DE | 299 09 537 U1 | 10/1999 |
| DE | 199 23 527 | 11/2000 |

(Continued)

OTHER PUBLICATIONS

Adobe Systems, Inc. website http://www.adobe.com/products/acrobat/cooltype.html.

(Continued)

*Primary Examiner* — Amare Mengistu
*Assistant Examiner* — Joseph G Rodriguez
(74) *Attorney, Agent, or Firm* — Innovation Counsel LLP (57) ABSTRACT

Methods are disclosed to render image data over time. In one embodiment, a mapping from image data values to first and second sets of subpixels in a plurality of output frames uses brightness versus viewing angle performance measures to reduce color error when the image is viewed on the display panel at an off-normal viewing angle. In another embodiment, temporal subpixel rendering is used to improve the viewing angle in LCD displays or to improve subpixel rendering in other display technologies.

5 Claims, 11 Drawing Sheets

U.S. PATENT DOCUMENTS

| | | |
|---|---|---|
| 5,052,785 A | 10/1991 | Takimoto et al. |
| 5,062,057 A | 10/1991 | Blacken et al. |
| 5,113,274 A | 5/1992 | Takahashi et al. |
| 5,132,674 A | 7/1992 | Bottorf |
| 5,144,288 A | 9/1992 | Hamada et al. |
| 5,184,114 A | 2/1993 | Brown |
| 5,189,404 A | 2/1993 | Masimo et al. |
| 5,196,924 A | 3/1993 | Lumelsky et al. |
| 5,233,385 A | 8/1993 | Sampsell |
| 5,311,337 A | 5/1994 | McCartney, Jr. |
| 5,315,418 A | 5/1994 | Sprague et al. |
| 5,334,996 A | 8/1994 | Tanigaki et al. |
| 5,341,153 A | 8/1994 | Benzschawel et al. |
| 5,398,066 A | 3/1995 | Martinez-Uriegas et al. |
| 5,416,890 A | 5/1995 | Beretta |
| 5,436,747 A | 7/1995 | Suzuki |
| 5,438,649 A | 8/1995 | Ruetz |
| 5,448,652 A | 9/1995 | Vaidyanathan et al. |
| 5,450,216 A | 9/1995 | Kasson |
| 5,461,503 A | 10/1995 | Deffontaines et al. |
| 5,477,240 A | 12/1995 | Huebner et al. |
| 5,485,293 A | 1/1996 | Robinder |
| 5,535,028 A | 7/1996 | Bae et al. |
| 5,541,653 A | 7/1996 | Peters et al. |
| 5,561,460 A | 10/1996 | Katoh et al. |
| 5,563,621 A | 10/1996 | Silsby |
| 5,579,027 A | 11/1996 | Sakurai et al. |
| 5,638,128 A * | 6/1997 | Hoogenboom et al. .. 375/240.15 |
| 5,642,176 A | 6/1997 | Abukawa et al. |
| 5,646,702 A | 7/1997 | Akinwande et al. |
| 5,648,793 A | 7/1997 | Chen |
| 5,694,186 A | 12/1997 | Yanagawa et al. |
| 5,719,639 A | 2/1998 | Imamura |
| 5,724,442 A | 3/1998 | Ogatsu et al. |
| 5,731,818 A | 3/1998 | Wan et al. |
| 5,739,802 A | 4/1998 | Mosier |
| 5,748,828 A | 5/1998 | Steiner et al. |
| 5,754,163 A | 5/1998 | Kwon |
| 5,754,226 A | 5/1998 | Yamada et al. |
| 5,792,579 A | 8/1998 | Phillips |
| 5,815,101 A | 9/1998 | Fonte |
| 5,821,913 A | 10/1998 | Mamiya |
| 5,899,550 A | 5/1999 | Masaki |
| 5,917,556 A | 6/1999 | Katayama |
| 5,929,843 A | 7/1999 | Tanioka |
| 5,933,253 A | 8/1999 | Ito et al. |
| 5,949,496 A | 9/1999 | Kim |
| 5,973,664 A | 10/1999 | Badger |
| 5,990,997 A | 11/1999 | Jones et al. |
| 6,002,446 A | 12/1999 | Eglit |
| 6,008,868 A | 12/1999 | Silverbrook |
| 6,034,666 A | 3/2000 | Kanai et al. |
| 6,038,031 A | 3/2000 | Murphy |
| 6,049,626 A | 4/2000 | Kim |
| 6,054,832 A | 4/2000 | Kunzman et al. |
| 6,061,533 A | 5/2000 | Kajiwara |
| 6,064,363 A | 5/2000 | Kwon |
| 6,069,670 A | 5/2000 | Borer |
| 6,097,367 A | 8/2000 | Kuriwaki et al. |
| 6,100,872 A | 8/2000 | Aratani et al. |
| 6,108,122 A | 8/2000 | Ulrich et al. |
| 6,144,352 A | 11/2000 | Matsuda et al. |
| 6,151,001 A | 11/2000 | Anderson et al. |
| 6,160,535 A | 12/2000 | Park |
| 6,184,903 B1 | 2/2001 | Omori |
| 6,188,385 B1 | 2/2001 | Hill et al. |
| 6,198,507 B1 | 3/2001 | Ishigami |
| 6,219,025 B1 | 4/2001 | Hill et al. |
| 6,225,967 B1 | 5/2001 | Hebiguchi |
| 6,225,973 B1 | 5/2001 | Hill et al. |
| 6,236,390 B1 | 5/2001 | Hitchcock |
| 6,239,783 B1 | 5/2001 | Hill et al. |
| 6,243,055 B1 | 6/2001 | Fergason |
| 6,243,070 B1 | 6/2001 | Hill et al. |
| 6,256,425 B1 | 7/2001 | Kunzman |
| 6,262,710 B1 | 7/2001 | Smith |
| 6,271,891 B1 | 8/2001 | Ogawa et al. |
| 6,278,434 B1 | 8/2001 | Hill et al. |
| 6,297,826 B1 | 10/2001 | Semba et al. |
| 6,299,329 B1 | 10/2001 | Mui et al. |
| 6,326,981 B1 | 12/2001 | Mori et al. |
| 6,327,008 B1 | 12/2001 | Fujiyoshi |
| 6,335,719 B1 | 1/2002 | An et al. |
| 6,346,972 B1 | 2/2002 | Kim |
| 6,348,929 B1 | 2/2002 | Acharya et al. |
| 6,360,008 B1 | 3/2002 | Suzuki et al. |
| 6,360,023 B1 | 3/2002 | Betrisey et al. |
| 6,377,262 B1 | 4/2002 | Hitchcock et al. |
| 6,384,836 B1 | 5/2002 | Naylor, Jr. et al. |
| 6,388,644 B1 | 5/2002 | De Zwart et al. |
| 6,392,717 B1 | 5/2002 | Kunzman |
| 6,393,145 B2 | 5/2002 | Betrisey et al. |
| 6,396,505 B1 | 5/2002 | Lui et al. |
| 6,414,719 B1 | 7/2002 | Parikh |
| 6,417,867 B1 | 7/2002 | Hallberg |
| 6,429,867 B1 | 8/2002 | Deering |
| 6,441,867 B1 | 8/2002 | Daly |
| 6,453,067 B1 | 9/2002 | Morgan et al. |
| 6,466,618 B1 | 10/2002 | Messing et al. |
| 6,483,518 B1 | 11/2002 | Perry et al. |
| 6,545,653 B1 | 4/2003 | Takahara et al. |
| 6,545,740 B2 | 4/2003 | Werner |
| 6,570,584 B1 | 5/2003 | Cok et al. |
| 6,600,495 B1 | 7/2003 | Boland et al. |
| 6,624,828 B1 | 9/2003 | Dresevic et al. |
| 6,661,429 B1 | 12/2003 | Phan |
| 6,674,436 B1 | 1/2004 | Dresevic et al. |
| 6,714,206 B1 | 3/2004 | Martin et al. |
| 6,714,212 B1 | 3/2004 | Tsuboyama et al. |
| 6,738,526 B1 | 5/2004 | Betrisey et al. |
| 6,750,875 B1 | 6/2004 | Keely, Jr. et al. |
| 6,781,626 B1 | 8/2004 | Wang |
| 6,801,220 B2 | 10/2004 | Greier et al. |
| 6,804,407 B2 | 10/2004 | Weldy |
| 6,836,300 B2 | 12/2004 | Choo et al. |
| 6,850,294 B2 | 2/2005 | Roh et al. |
| 6,856,704 B1 | 2/2005 | Gallagher et al. |
| 6,867,549 B2 | 3/2005 | Cok et al. |
| 6,885,380 B1 | 4/2005 | Primerano et al. |
| 6,888,604 B2 | 5/2005 | Rho et al. |
| 6,897,876 B2 | 5/2005 | Murdoch et al. |
| 6,903,378 B2 | 6/2005 | Cok |
| 6,917,368 B2 | 7/2005 | Credelle et al. |
| 2001/0003446 A1* | 6/2001 | Takafuji ........................ 345/98 |
| 2001/0017515 A1 | 8/2001 | Kusunoki et al. |
| 2001/0040645 A1 | 11/2001 | Yamazaki |
| 2001/0048764 A1 | 12/2001 | Betrisey et al. |
| 2002/0012071 A1 | 1/2002 | Sun |
| 2002/0017645 A1 | 2/2002 | Yamazaki et al. |
| 2002/0093476 A1 | 7/2002 | Hill et al. |
| 2002/0122160 A1 | 9/2002 | Kunzman |
| 2002/0140831 A1 | 10/2002 | Hayashi |
| 2002/0149598 A1* | 10/2002 | Greier et al. ................ 345/589 |
| 2002/0190648 A1 | 12/2002 | Bechtel et al. |
| 2003/0011603 A1 | 1/2003 | Koyama et al. |
| 2003/0034992 A1 | 2/2003 | Brown Elliott et al. |
| 2003/0071775 A1 | 4/2003 | Ohashi et al. |
| 2003/0071943 A1 | 4/2003 | Choo et al. |
| 2003/0072374 A1 | 4/2003 | Sohm |
| 2003/0103058 A1 | 6/2003 | Elliott et al. |
| 2003/0146893 A1 | 8/2003 | Sawabe |
| 2003/0218618 A1 | 11/2003 | Phan |
| 2004/0008208 A1 | 1/2004 | Dresevic et al. |
| 2004/0021804 A1 | 2/2004 | Hong et al. |
| 2004/0036704 A1 | 2/2004 | Han et al. |
| 2004/0075764 A1 | 4/2004 | Law et al. |
| 2004/0085495 A1 | 5/2004 | Roh et al. |
| 2004/0095521 A1 | 5/2004 | Song et al. |
| 2004/0108818 A1 | 6/2004 | Cok et al. |
| 2004/0114046 A1 | 6/2004 | Lee et al. |
| 2004/0150651 A1 | 8/2004 | Phan |
| 2004/0155895 A1 | 8/2004 | Lai |
| 2004/0169807 A1 | 9/2004 | Rho et al. |
| 2004/0174375 A1 | 9/2004 | Credelle et al. |
| 2004/0174380 A1 | 9/2004 | Credelle et al. |
| 2004/0179160 A1 | 9/2004 | Rhee et al. |
| 2004/0189662 A1 | 9/2004 | Frisken et al. |

| | | | |
|---|---|---|---|
| 2004/0189664 A1 | 9/2004 | Frisken et al. | |
| 2004/0233339 A1 | 11/2004 | Elliott | |
| 2004/0239813 A1 | 12/2004 | Klompenhouwer | |
| 2004/0239837 A1 | 12/2004 | Hong et al. | |
| 2004/0263528 A1 | 12/2004 | Murdoch et al. | |
| 2005/0007539 A1 | 1/2005 | Taguchi et al. | |
| 2005/0024380 A1 | 2/2005 | Lin et al. | |
| 2005/0031199 A1 | 2/2005 | Ben-Chorin et al. | |
| 2005/0040760 A1 | 2/2005 | Taguchi et al. | |
| 2005/0068477 A1 | 3/2005 | Shin et al. | |
| 2005/0083356 A1 | 4/2005 | Roh et al. | |
| 2005/0088385 A1 | 4/2005 | Elliott et al. | |
| 2005/0094871 A1 | 5/2005 | Berns et al. | |
| 2005/0099426 A1 | 5/2005 | Primerano et al. | |
| 2005/0134600 A1 | 6/2005 | Credelle et al. | |
| 2005/0140634 A1 | 6/2005 | Takatori | |
| 2005/0162600 A1 | 7/2005 | Rho et al. | |
| 2005/0169551 A1 | 8/2005 | Messing et al. | |

FOREIGN PATENT DOCUMENTS

| | | |
|---|---|---|
| DE | 201 09 354 U1 | 9/2001 |
| EP | 0 158 366 A2 | 10/1985 |
| EP | 0 203 005 A1 | 11/1986 |
| EP | 0 322 106 A2 | 6/1989 |
| EP | 0 671 650 A2 | 9/1995 |
| EP | 0 793 214 A1 | 2/1996 |
| EP | 0 812 114 A1 | 12/1997 |
| EP | 0 878 969 A3 | 11/1998 |
| EP | 0 899 604 A2 | 3/1999 |
| EP | 1 083 539 A2 | 3/2001 |
| EP | 1 261 014 A2 | 11/2002 |
| EP | 1 381 020 A2 | 1/2004 |
| GB | 2 133 912 A | 8/1984 |
| GB | 2 146 478 A | 4/1985 |
| JP | 60-107022 | 6/1985 |
| JP | 02-000826 A | 1/1990 |
| JP | 02-983027 B2 | 4/1991 |
| JP | 03-78390 | 4/1991 |
| JP | 03-036239 B | 5/1991 |
| JP | 06-102503 | 4/1994 |
| JP | 06-214250 | 8/1994 |
| JP | 2001203919 | 7/2001 |
| JP | 2002215082 A | 7/2002 |
| JP | 2004-004822 | 1/2004 |
| WO | WO 97/23860 | 7/1997 |
| WO | WO 00/21067 | 4/2000 |
| WO | WO 00/42564 | 7/2000 |
| WO | WO 00/42762 | 7/2000 |
| WO | WO 00/45365 | 8/2000 |
| WO | WO 00/65432 | 11/2000 |
| WO | WO 00/67196 | 11/2000 |
| WO | WO 01/10112 A2 | 2/2001 |
| WO | WO 01/29817 A1 | 4/2001 |
| WO | WO 01/52546 A2 | 7/2001 |
| WO | WO 02/059685 A2 | 8/2002 |
| WO | WO 03/014819 A1 | 2/2003 |
| WO | WO 2004/021323 A2 | 3/2004 |
| WO | WO 2004/027503 A1 | 4/2004 |
| WO | WO 2004/040548 | 5/2004 |
| WO | WO 2004/086128 A1 | 10/2004 |
| WO | WO 2005/050296 A1 | 6/2005 |

OTHER PUBLICATIONS

Betrisey, C., et al., Displaced Filtering for Patterned Displays, SID Symp. Digest, 296-299, 1999.
Brown Elliott, C., "Active Matrix Display . . . ", IDMC 2000, 185-189, Aug. 2000.
Brown Elliott, C., "Color Subpixel Rendering Projectors and Flat Panel Displays," SMPTE, Feb. 27-Mar. 1, 2003, Seattle, WA pp. 1-4.
Brown Elliott, C, "Co-Optimization of Color AMLCD Subpixel Architecture and Rendering Algorithms," SID 2002 Proceedings Paper, May 30, 2002 pp. 172-175.
Brown Elliott, C, "Development of the PenTile Matrix™ Color AMLCD Subpixel Architecture and Rendering Algorithms", SID 2003, Journal Article.
Brown Elliott, C, "New Pixel Layout for PenTile Matrix™ Architecture", IDMC 2002, pp. 115-117.
Brown Elliott, C, "Pentile Matirx™ Displays and Drivers" ADEAC Proceedings Paper, Portland OR., Oct. 2005.
Brown Elliott, C, "Reducing Pixel Count Without Reducing Image Quality", Information Display Dec. 1999, vol. 1, pp. 22-25.
Carvajal, D., "Big Publishers Looking Into Digital Books," The NY Times, Apr. 3, 2000, Business/ Financial Desk.
"ClearType magnified", Wired Magazine, Nov. 8, 1999, Microsoft Typography, article posted Nov. 8, 1999, last updated Jan. 27, 1999 1 page.
Credelle, Thomas, "P-00: MTF of High-Resolution PenTile Matrix Displays", Eurodisplay 02 Digest, 2002 pp. 1-4.
Daly, Scott, "Analysis of Subtriad Addressing Algorithms by Visual System Models",SID Symp. Digest, Jun. 2001 pp. 1200-1203.
Feigenblatt, R.I., Full-color imaging on amplitude-quantized color mosaic displays, SPIE, 1989, pp. 199-204.
Feigenblatt, Ron, "Remarks on Microsoft ClearType™", http://www.geocities.com/SiliconValley/Ridge/6664/ClearType.html, Dec. 5, 1998, Dec. 7, 1998, Dec. 12, 1999, Dec. 26, 1999, Dec. 30, 1999 and Jun. 19, 2000, 30 pages.
Gibson, S., "Sub-Pixel Rendering; How it works," Gibson Research Corp., http://www.grc.com/ctwhat.html.
Johnston, Stuart, "An Easy Read: Microsoft's ClearType," InformationWeek Online, Redmond WA, Nov. 23, 1998. 3 pages.
Johnston, Stuart, "Clarifying ClearType," InformationWeek Online, Redmond WA, Jan. 4, 1999, 4 pages.
Just Outta Beta, Wired Magazine, Dec. 1999 Issue 7-12, 3 pages.
Klompenhouwer, Michiel, Subpixel Image Scaling for Color Matrix Displays, SID Symp. Digest, May 2002, pp. 176-179.
Krantz, John et al., Color Matrix Display Image Quality: The Effects of Luminance . . . SID 90 Digest, pp. 29-32.
Lee, Baek-woon et al., 40.5L: Late-News Paper: TFT-LCD with RGBW Color system, SID 03 Digest, 2003, pp. 1212-1215.
Markoff, John, Microsoft's Cleartype Sets Off Debate on Originality, NY Times, Dec. 7, 1998, 5 pages.
Martin, R., et al., "Detectability of Reduced Blue-Pixel Count in Projection Displays," SID Symp. Digest, May 1993, pp. 606-609.
Messing, Dean et al., Improved Display Resolution of Subsampled Colour Images Using Subpixel Addressing, IEEE ICIP 2002, vol. 1, pp. 625-628.
Messing, Dean et al., Subpixel Rendering on Non-Striped Colour Matrix Displays, 2003 International Conf on Image Processing, Sep. 2003, Barcelona, Spain, 4 pages.
"Microsoft ClearType," website, Mar. 26, 2003, 4 pages.
Microsoft Corp. website, http://www.microsoft.com/typography/cleartype, 7 pages.
Microsoft press release, Microsoft Research Announces Screen Display Breakthrough at COMDEX/Fall '98; . . . Nov. 15, 1998.
Murch, M., "Visual Perception Basics," SID Seminar, 1987, Tektronix Inc, Beaverton Oregon.
Okumura et al., "A New Flicker-Reduction Drive Method for High Resolution LCTVs", SID Digest,pp. 551-554, 2001.
Platt, John, Optimal Filtering for Patterned Displays, IEEE Signal Processing Letters, 2000, 4 pages.
Wandell, Brian A., Stanford University, "Fundamentals of Vision: Behavior . . . ," Jun. 12, 1994, Society for Information Display (SID) Short Course S-2, Fairmont Hotel, San Jose, California.
USPTO, Notice of Allowance, dated Dec. 15, 2004 in US Patent 6,917,368 (U.S. Appl. No. 10/379,766.
USPTO, Non-Final Office Action, dated Aug. 1, 2006 in US Patent Publication No. 2005/0134600, (U.S. Appl. No. 11/048,498.
USPTO, Non-Final Office Action, dated Oct. 26, 2004 in US Patent Publication No. 2004/0174380 (U.S. Appl. No. 10/379,765.
Clairvoyante Inc, Response to Non-Final Office Action, dated Jan. 24, 2005 in US Patent Publication No. 2004/0174380 (U.S. Appl. No. 10/379,765.
USPTO, Final Office Action, dated Jun. 2, 2005 in US Patent Publication No. 2004/0174380 (U.S. Appl. No. 10/379,765.
USPTO, Non-Final Office Action, dated Nov. 2, 2005 in US Patent Publication No. 2004/0174380 (U.S. Appl. No. 10/379,765.
Clairvoyante Inc, Response to Non-Final Office Action, dated Apr. 10, 2006 in US Patent Publication No. 2004/0174380 (U.S. Appl. No. 10/379,765.
USPTO, Notice of Allowance, dated Jul. 26, 2006 in US Patent Publication No. 2004/0174380 (U.S. Appl. No. 10/379,765.

* cited by examiner

FRAME 1

FRAME 2

FIG. 7

FRAME 1

FRAME 2

SYSTEMS AND METHODS FOR TEMPORAL SUBPIXEL RENDERING OF IMAGE DATA

CROSS REFERENCE TO RELATED APPLICATIONS

This application is a divisional of U.S. Nonprovisional application Ser. No. 10/379,767 entitled SYSTEMS AND METHODS FOR TEMPORAL SUBPIXEL RENDERING OF IMAGE DATA, filed on Mar. 4, 2003, which is incorporated by reference herein.

The present application is related to commonly owned U.S. patent applications: (1) U.S. patent application Ser. No. 10/379,766 entitled "SUB-PIXEL RENDERING SYSTEM AND METHOD FOR IMPROVED DISPLAY VIEWING ANGLES," published as U.S. Patent Application Publication 2004/0174375; and (2) U.S. patent application Ser. No. 10/379,765, entitled "SYSTEMS AND METHODS FOR MOTION ADAPTIVE FILTERING," published as U.S. Patent Application Publication 2004/0174380. U.S. Patent Application Publications 2004/0174375 and 2004/0174380 are hereby incorporated by reference herein.

BACKGROUND

The present application is related to display systems, and more particularly, to systems and methods for subpixel rendering source image data over time. Temporal subpixel rendering may be used to improve viewing angle in LCD displays or to improve subpixel rendering in other display technologies.

In commonly owned U.S. Patent Applications: (1) U.S. patent application Ser. No. 09/916,232 entitled "ARRANGEMENT OF COLOR PIXELS FOR FULL COLOR IMAGING DEVICES WITH SIMPLIFIED ADDRESSING" filed Jul. 25, 2001, and published as U.S. Patent Application Publication No. 2002/0015110 ("the '110 application"); (2) U.S. patent application Ser. No. 10/278,353, entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002, and published as U.S. Patent Application Publication No. 2003/0128225 ("the '225 application"); (3) U.S. patent application Ser. No. 10/278,352, entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUBPIXELS," filed Oct. 22, 2002, and published as U.S. Patent Application Publication No. 2003/0128179 ("the '179 application"); (4) U.S. patent application Ser. No. 10/243,094, entitled "IMPROVED FOUR COLOR ARRANGEMENTS AND EMITTERS FOR SUBPIXEL RENDERING," filed Sep. 13, 2002, and published as U.S. Patent Application Publication No. 2004/0051724 ("the '724 application); (5) U.S. patent application Ser. No. 10/278,328, entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002, and published as U.S. Patent Application Publication No. 2003/0117423 ("the '423 application"); (6) U.S. patent application Ser. No. 10/278, 393, entitled "COLOR DISPLAY HAVING HORIZONTAL SUB-PIXEL ARRANGEMENTS AND LAYOUTS," filed Oct. 22, 2002, and published as U.S. Patent Application Publication No. 2003/0090581 ("the '581 application"); and (7) U.S. patent application Ser. No. 10/347,001, entitled "SUB-PIXEL ARRANGEMENTS FOR STRIPED DISPLAYS AND METHODS AND SYSTEMS FOR SUB-PIXEL RENDERING SAME," filed Jan. 16, 2003, and published as U.S. Patent Application Publication No. 2004/0080479 ("the '479 application"), novel subpixel arrangements are therein disclosed for improving the cost/performance curves for image display devices. The '110, '225, '179, '724, '423, '581 and '479 applications are all incorporated by reference herein.

These improvements are particularly pronounced when coupled with subpixel rendering (SPR) systems and methods further disclosed in those applications and in commonly owned U.S. Patent Applications: (1) U.S. patent application Ser. No. 10/051,612, entitled "CONVERSION OF RGB PIXEL FORMAT DATA TO PENTILE MATRIX SUB-PIXEL DATA FORMAT," filed Jan. 16, 2002, and published as U.S. Patent Application Publication No. 2003/0034992 ("the '992 application"); (2) U.S. patent application Ser. No. 10/150,355, entitled "METHODS AND SYSTEMS FOR SUB-PIXEL RENDERING WITH GAMMA ADJUSTMENT," filed May 17, 2002, and published as U.S. Patent Application Publication No. 2003/0103058 ("the '058 application"); (3) U.S. patent application Ser. No. 10/215,843, entitled "METHODS AND SYSTEMS FOR SUB-PIXEL RENDERING WITH ADAPTIVE FILTERING," filed Aug. 8, 2002, and published as U.S. Patent Application Publication No. 2003/0085906 ("the '906 application"). The '992, '058, and '906 applications are herein incorporated by reference herein.

BRIEF DESCRIPTION OF THE DRAWINGS

The accompanying drawings, which are incorporated in, and constitute a part of this specification illustrate exemplary implementations and embodiments of the invention and, together with the description, serve to explain principles of the invention.

DETAILED DESCRIPTION

Reference will now be made in detail to implementations and embodiments, examples of which are illustrated in the accompanying drawings. Wherever possible, the same reference numbers will be used throughout the drawings to refer to the same or like parts.

Figure 1:
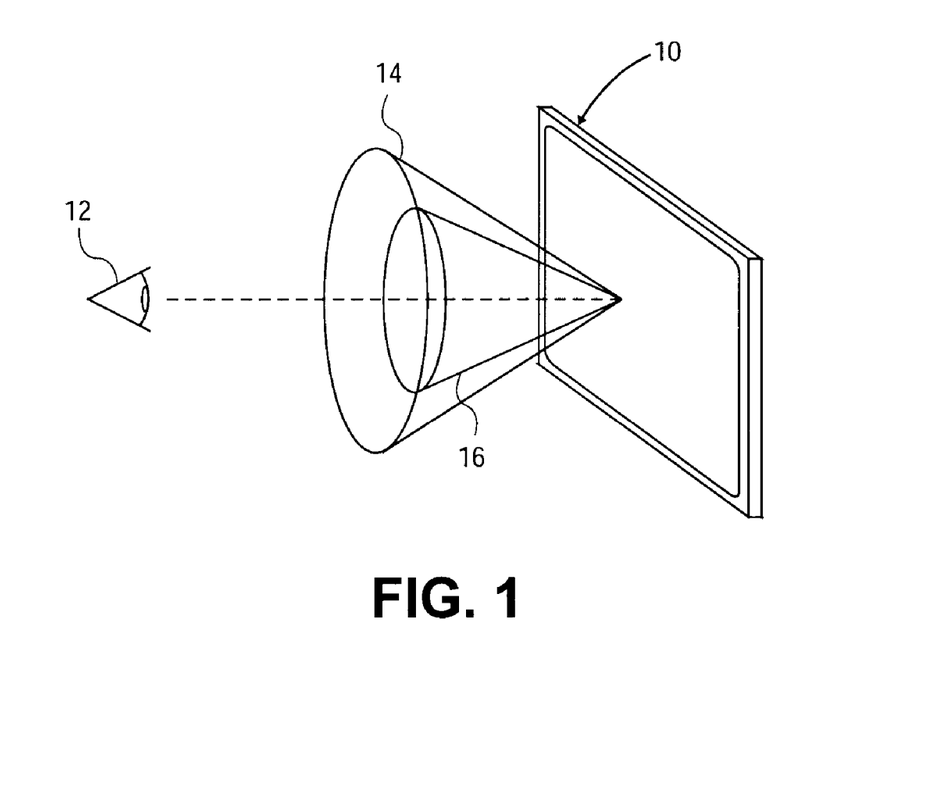
FIG. 1 depicts an observer viewing a display panel and the cones of acceptable viewing angle off the normal axis to the display.

FIG. 1 shows a display panel 10 capable of displaying an image upon its surface. An observer 12 is viewing the image on the display at an appropriate distance for this particular display. It is known that, depending upon the technology of the display device (liquid crystal display LCD, optical light emitting diode OLED, EL, and the like) that the quality of the displayed image falls off as a function of the viewing angle, but particularly so for LCDs. The outer cone 14 depicts an acceptable cone of viewing angles for the observer 12 with a typical RGB striped system that is not performing sub-pixel rendering (SPR) on the displayed image data.

Figure 2:
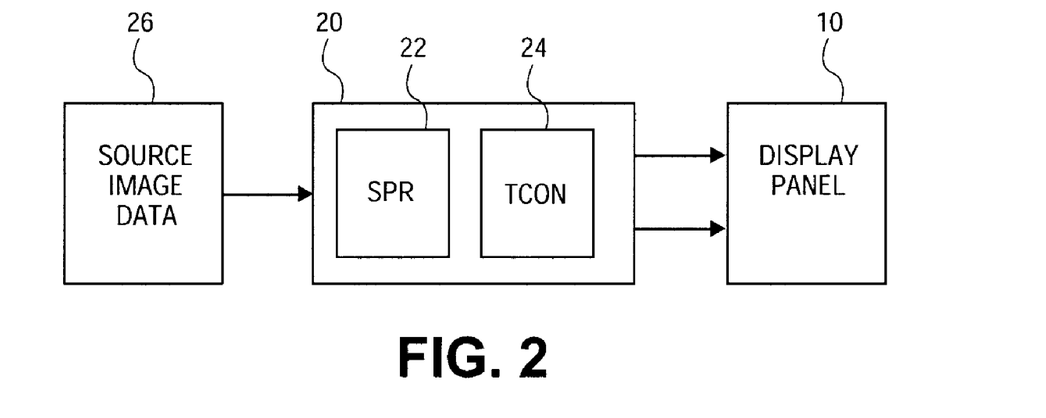
FIG. 2 shows one embodiment of a graphics subsystem driving a panel with subpixel rendering and timing signals.

A further reduction in acceptable viewing angle (i.e. inner cone 16) may occur when the image data itself is sub-pixel rendered in accordance with any of the SPR algorithms and systems as disclosed in the incorporated applications or with any known SPR system and methods. One embodiment of such a system is shown in FIG. 2 wherein source image data 26 is placed through a driver 20 which might include SPR subsystem 22 and timing controller 24 to supply display image data and control signals to panel 10. The SPR subsystem could reside in a number of embodiments. For example, it could reside entirely in software, on a video graphics adaptor, a scalar adaptor, in the TCon, or on the glass itself implemented with low temperature polysilicon TFTs.

This reduction in acceptable viewing angle is primarily caused by color artifacts that may appear when viewing a subpixel rendered image because high spatial frequency edges have different values for red, green, and blue subpixels. For example, black text on a white background which uses SPR on a design similar to FIG. 5 will result in the green subpixels switching between 100% and 0% while the red and blue subpixels switching from 100% to 50%.

Figure 3:
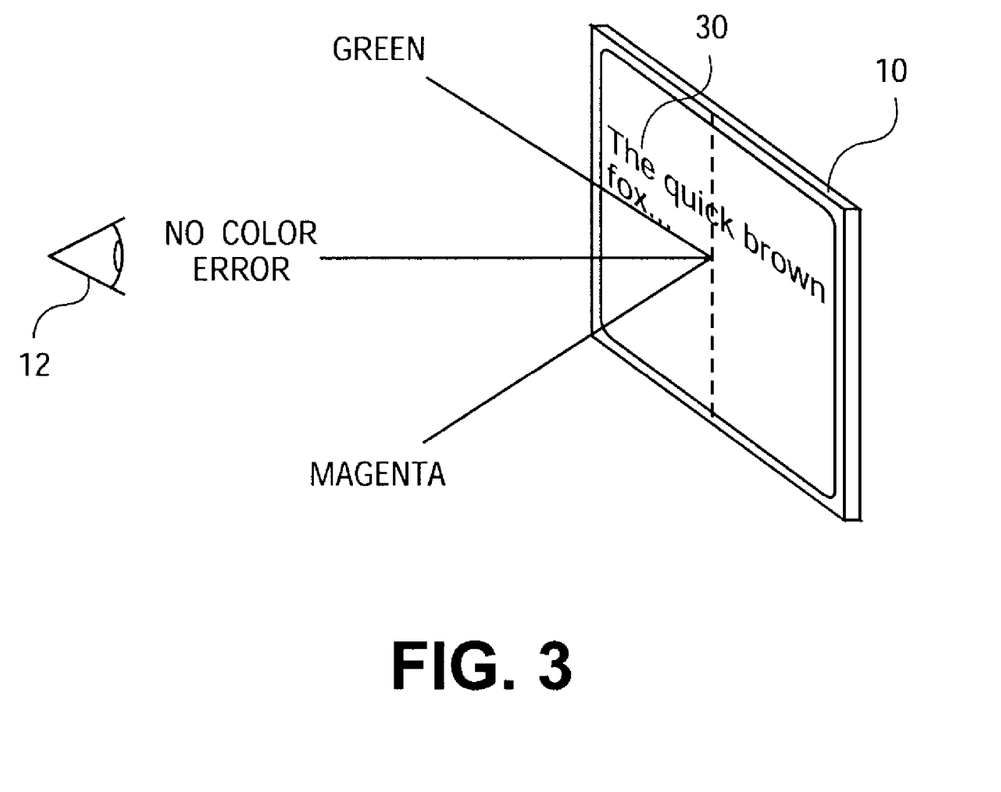
FIG. 3 depicts an observer viewing a display panel and the possible color errors that might be introduced as the observer views subpixel rendered text off normal axis to the panel.
Figure 4:
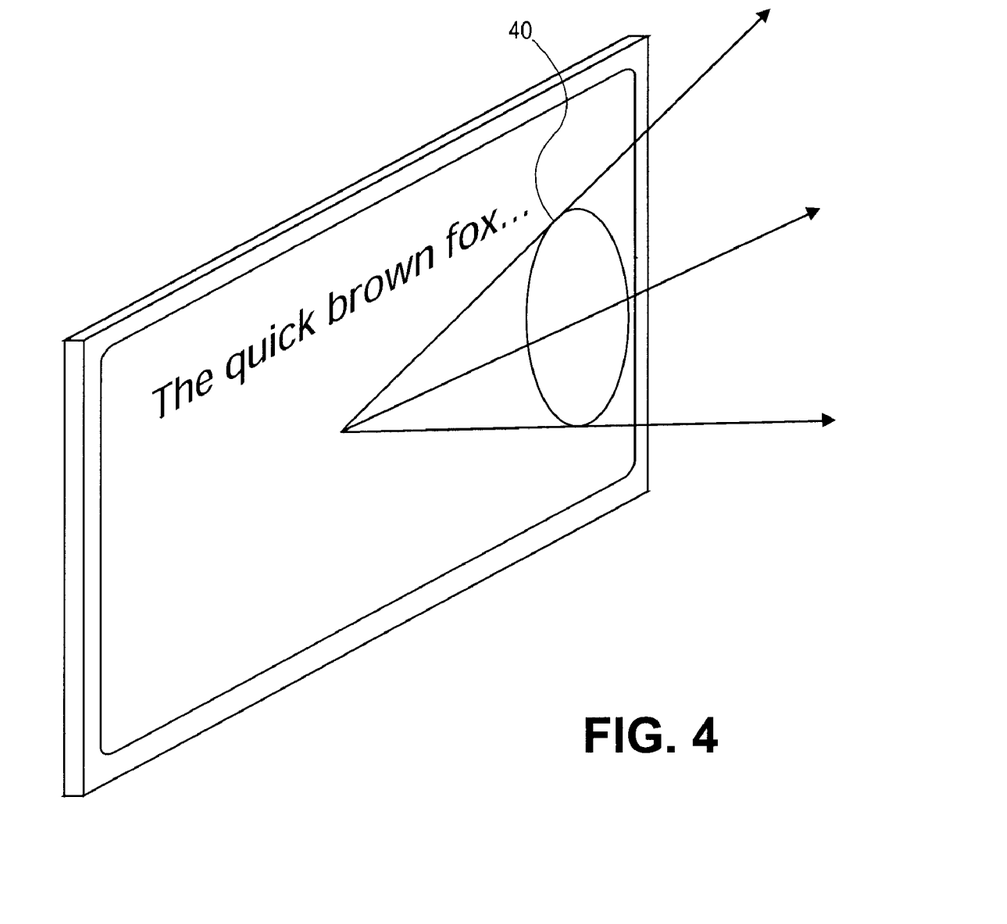
FIG. 4 depicts a display panel and a possible cone of acceptable viewing angles for subpixel rendered text once techniques of the present application are applied.

FIG. 3 depicts the situation as might apply to subpixel rendered black text 30 on a white background. As shown, observer 12 experiences no color artifact when viewing the text substantially on the normal axis to the panel 10. However, when the observer "looks down or up" on the screen, the displayed data may show a colored hue on a liquid crystal display (LCD), which is due to the anisotropic nature of viewing angle on some LCDs for different gray levels, especially for vertical angles (up/down). Thus it would be desirable to perform corrections to the SPR data in order to increase the acceptable viewing angle 40 of SPR data, as depicted in FIG. 4.

Currently, red and blue image data are averaged via a SPR process to create the proper value on the red and blue subpixels on a display. This averaging causes viewing angle problems for some liquid crystal displays because the viewing angle characteristics are a function of the voltage setting on the pixel. To smooth out the visual effects, several embodiments disclosed herein describe a temporal method to create the average value such that the viewing angle is not affected by subpixel rendering. As will be discussed further below in connection with FIG. 12, one embodiment takes the image data from two adjacent source pixels and uses them sequentially frame by frame. Since the data from pixel to pixel does not change dramatically, there should be no flicker observed. For sharp transitions, adaptive filtering takes over and this temporal averaging can be turned off.

Figure 5:
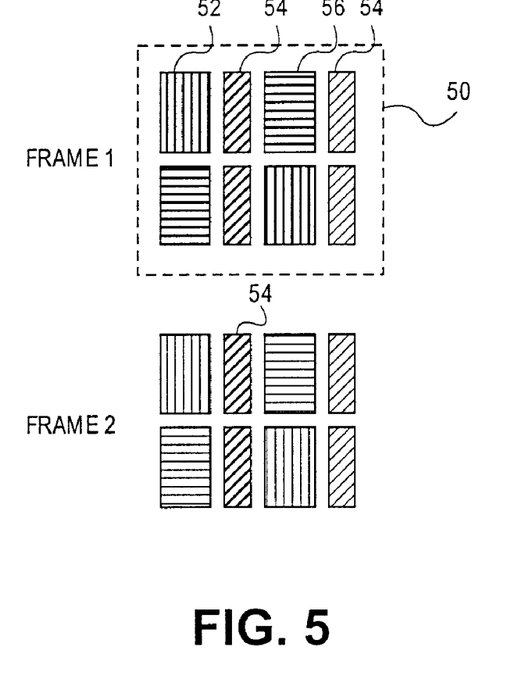
FIGS. 5 through 8 show several embodiments of performing temporal subpixel rendering over two frames.

As an example, FIG. 5 shows how a "white" line can be rendered on a panel having a subpixel repeat grouping—such as grouping 50 which comprises red subpixels 52, green subpixels 54, and blue subpixels 56. It will be appreciated that this choice of subpixel repeat grouping is merely for illustrative purposes and that other subpixel repeat groupings would suffice for purposes of the present invention. Such other subpixel repeat groupings are further described in the above-incorporated by reference patent applications.

FIGS. 5-8 depict various embodiments of temporally subpixel rendering a single vertical white line in order to reduce the amount of off-normal axis color error. In Frame 1 of FIG. 5, the first three columns of colored subpixels are fully illuminated (as indicated by the heavy hatching lines); whereas in Frame 2 of FIG. 5, only the middle column of green subpixels 54 are fully illuminated and the rest are off. If the two frames are switched sufficiently fast enough, then the visual effect remains a "white" line; but, as will be explained below, reduces the amount of off-normal axis color error.

Figure 6:
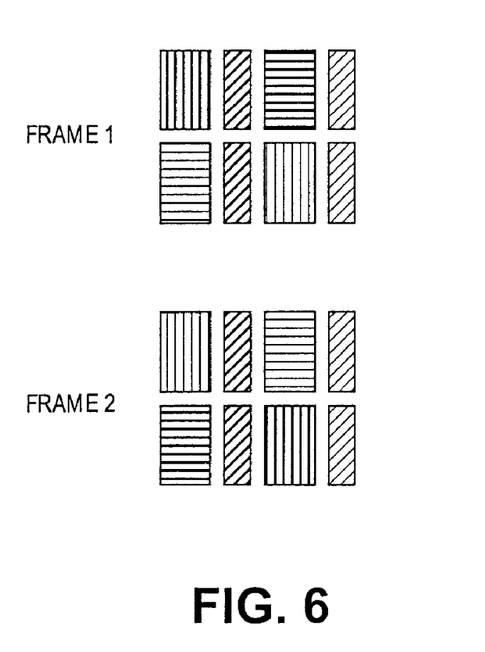

FIG. 6 shows Frame 1 with the top row (first three subpixels) and only the bottom middle column green subpixel as fully illuminated. Frame 2 has the bottom row (first three subpixels) and top middle column green subpixel as fully illuminated.

Figure 7:
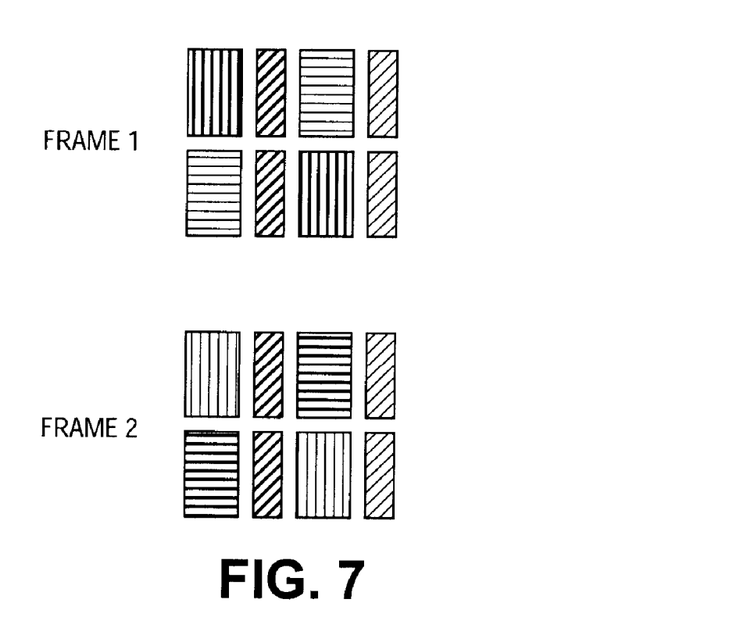

FIG. 7 shows Frame 1 with upper left and lower right red subpixels with two middle green subpixels fully illuminated. Frame 2 has the lower left and upper right blue subpixels with two green subpixels fully illuminated.

Figure 8:
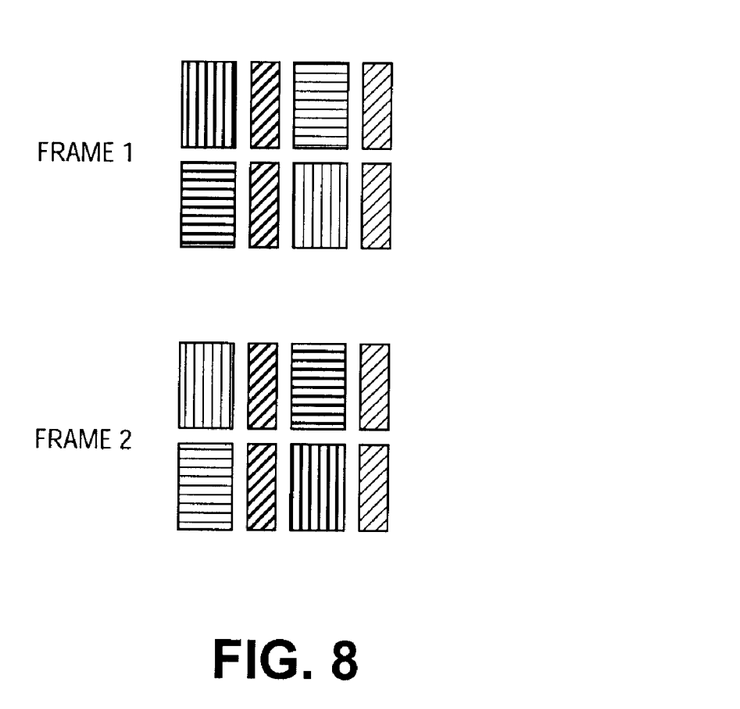

FIG. 8 shows Frame 1 with the first two columns fully illuminated; while Frame 2 shows the second and third columns fully illuminated. All four FIGS. 5-8 depict embodiments of performing subpixel rendering in time that produces for the human viewer the proper color on the normal axis viewing; while reducing the color error introduced on off-normal axis viewing—particularly for LCD displays. These combinations of ON and OFF pixels can be varied in a prescribed time sequence to minimize flicker; for example, the sequence of FIG. 5 through 8 could be repeated over 8 frames of data.

Figure 9:
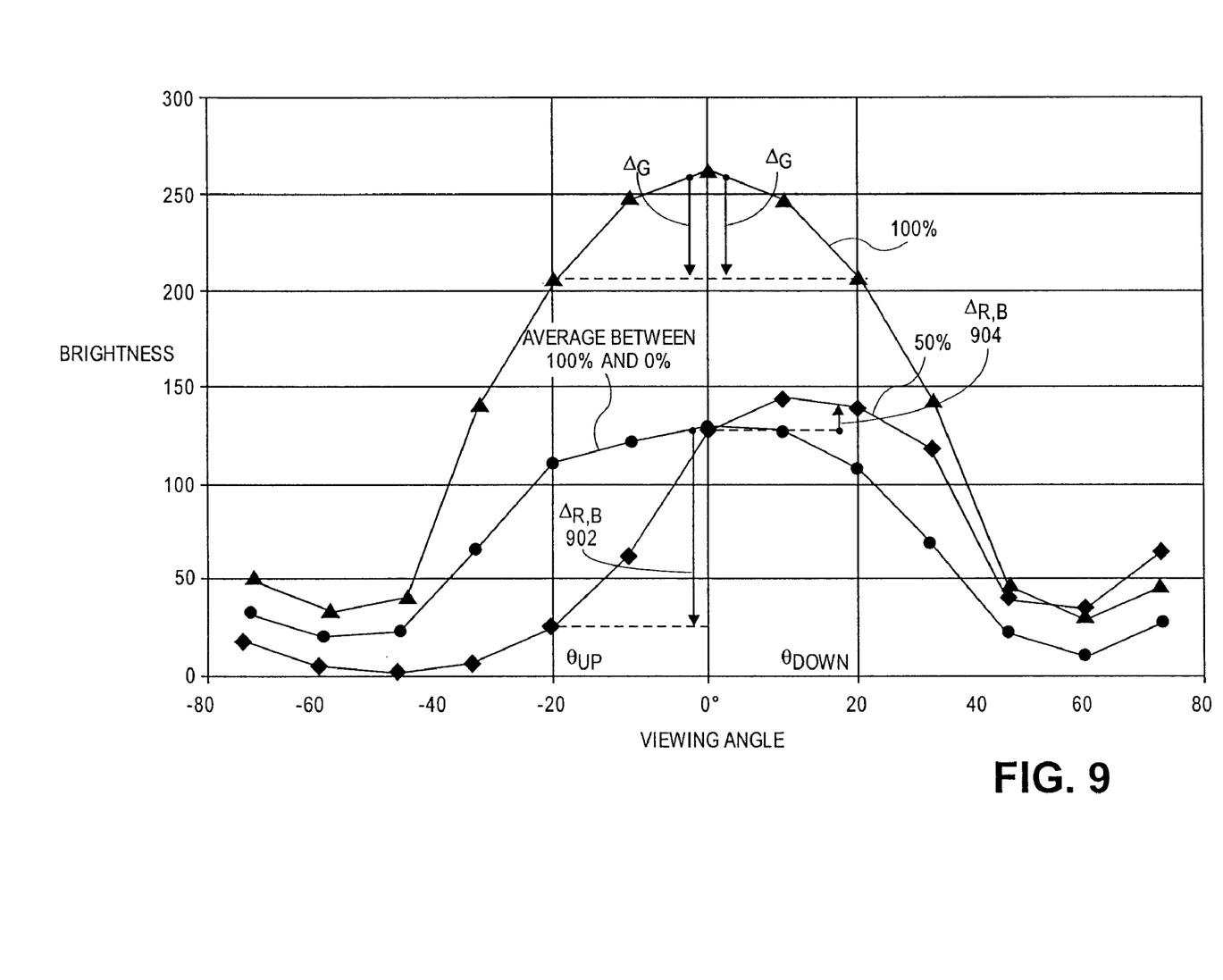
FIG. 9 shows two curves of brightness (100% and 50%) versus viewing angle on a LCD display.

For illustrative purposes, FIG. 9 depicts why these color artifacts arise. When a single "white" line is drawn as in Frame 1 of FIG. 5 and held over time (which is typical for SPR that does not vary over time), it is centered on the middle row of green subpixels. As measured on the normal axis, the middle column of green subpixels is fully illuminated at 100% brightness level; the blue and the red subpixels are illuminated at 50% brightness. Put another way, the green subpixel is operating with a filter kernel of [255] (i.e. the "unity" filter with '255' being 100% on a digital scale); while the blue and red subpixels have a filter kernel of [128 128] (i.e. a "box" filter with '128' being 50% on a digital scale). At zero viewing angle (i.e. normal to the display), a "white" line is shown because the red and blue subpixels are of double width of the green subpixels. So with G~100, R~50, B~50, a chroma-balaced white is produced at 100−2×(50)−2×(50). The multiplicative factor of "2" for red and blue comes from the fact that the red and blue subpixels are twice the width of the green subpixels.

As the viewing angle increases to angle $\Theta_{UP}$, then the observer would view a fall-off of $\Delta_G$ in the green subpixel brightness—while viewing a $\Delta_{R,B}$ fall-off 902 in the brightness of either the red or the blue subpixel brightness. Thus, at $\Theta_{UP}$, there is G'~80, R'~20, B'~20, which results in the image of the white line assuming a more greenish hue—e.g. 80−2×(20)−2×(20). For angle $\Theta_{DOWN}$, the green pixels will again fall off an amount $\Delta_G$, while the red and blue subpixels will actually rise an amount $\Delta_{R,B}$ 904. In this case, the white line will assume a magenta hue.

So, to correct for this color artifact, it might be desirable to drive the red and blue subpixels effectively on a different curve so that the delta fall-off in the green vs. the red/blue subpixels better match each other as a relative percentage of their total curve. An intermediate curve which is the average curve between 100% and 0% is shown in FIG. 9. This intermediate curve depicts the time-averaged curve that occurs if the red and blue subpixels are driven in Frame 1 to 100% luminance and in Frame 2 to 0% luminance. As may be seen, at the same off-normal axis angle as in FIG. 9, the difference in the fall-off between the green and the red/blue subpixels are better matched.

Figure 10A:
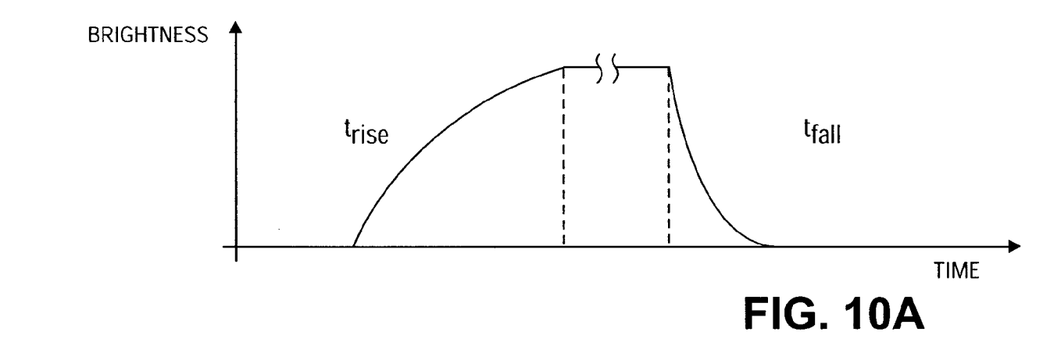
FIGS. 10A-10E show a series of curves depicting the performance of brightness versus time when the response curve of a typical liquid crystal is modulated by various pulse trains.
Figure 10B:
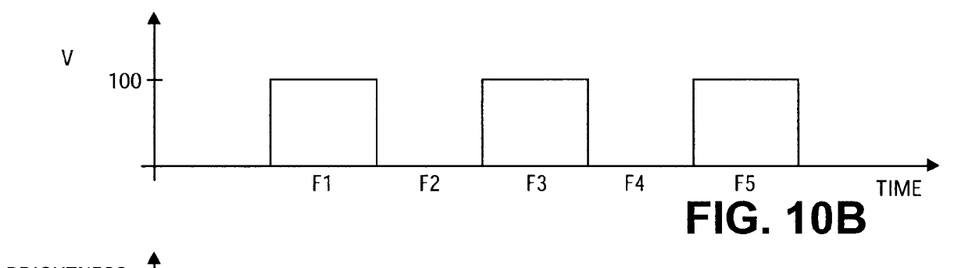
Figure 10C:
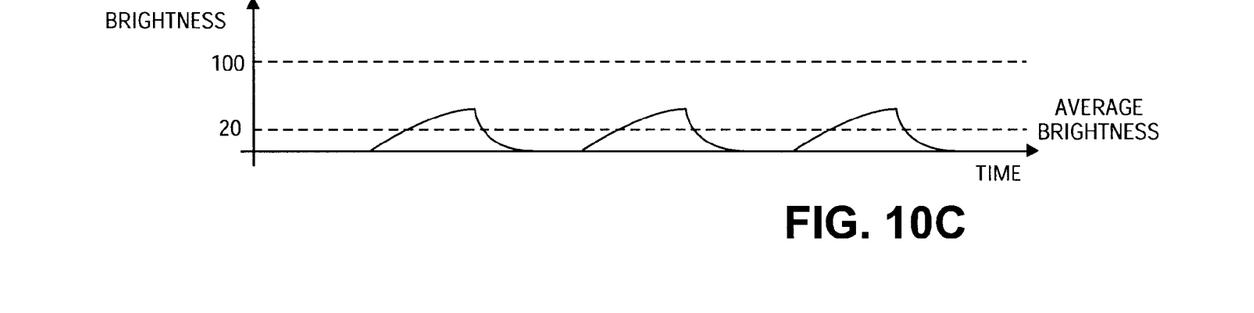

Other embodiments and refinements of the above temporal subpixel rendering are possible. FIGS. 10A, B, and C are a series of three graphs. FIG. 10A shows a typical brightness response curve of a liquid crystal over time. FIG. 10B shows a series of pulse trains—each a width equal to one frame and represents the voltage applied to the red and blue subpixels (e.g. for the white line example above). Thus, the red and blue subpixels are driven to 100% luminance for odd frames and 0% for even frames.

As may be seen, the response time for liquid crystals (as shown in FIG. 10A) is longer than the frame time, as shown in FIG. 10B. Thus, FIG. 10C shows the resulting brightness response of the red and blue subpixels on the display. As with our above example, the green subpixels are driven at 100% luminance. The average response for the red and blue subpixels in FIG. 10C is around 20%—which does not give a chroma-balanced white; but more of a greenish hue.

Figure 10D:
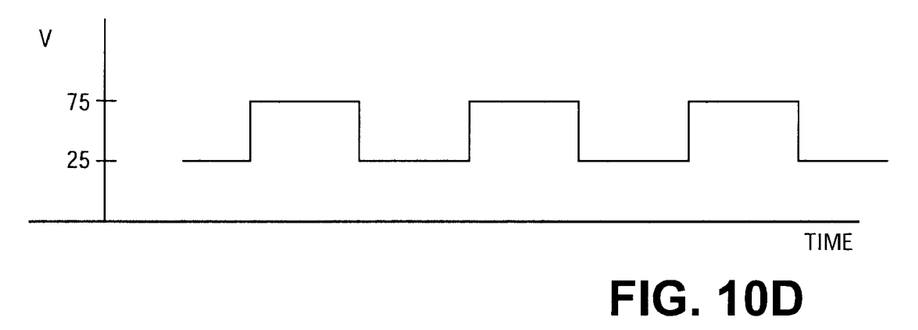
Figure 10E:
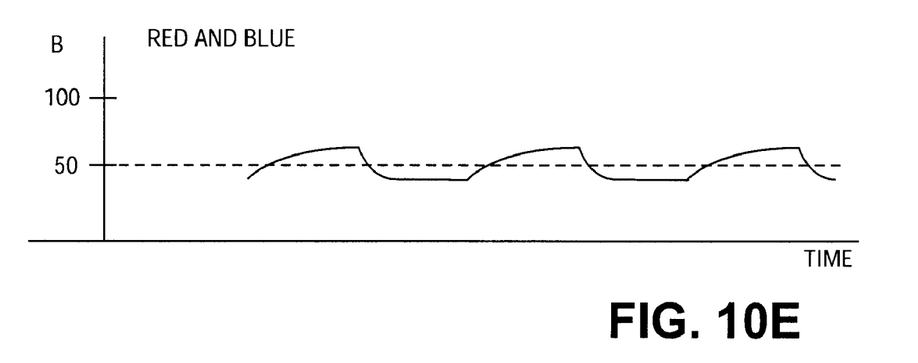

To correct this color imbalance, FIG. 10D depicts one embodiment of drive voltages that achieves approximately 50% average brightness of the red and blue subpixels. The effect of driving the red and blue subpixels with the pulse train depicted in FIG. 10D—that is, having two voltages that straddle the 50% luminance point of the red and blue subpixels—is shown in FIG. 10E. It will be appreciated that any suitable pairs of voltage values that substantially give the resulting luminance curve of FIG. 10E would suffice—so the present invention is not limited to the two voltages depicted in FIG. 10D.

An alternate embodiment that achieves a 50% average brightness but experiences near 100% and 0% peak luminances would improve the overall viewing angle performance because the liquid crystal has it's best viewing angles at these two extreme luminance values. If the LC does not fully switch, then the brightness of the red and blue pixels will be wrong and color fringing will be seen. In this case, a "gain" or offset to the pixel values can be applied so as to achieve the desired brightness. For example, if the pixel cannot fully switch in a frame time (~15 ms), then the average brightness (transmission) of the LCD will be less than the average of the two pixel values. If a black to white edge is desired, then the two values are 100% and 0% for an average of 50%. If, for example, the LC only switches to 50% and then goes back to 0%, it will be necessary to multiply the two pixel values by 0.5 and then add 0.25. Then the two states will switch between 100*0.5+0.25=75% and 0*0.5+0.25=25% for an average of the desired 50%. These gain and offset values are adjusted empirically or can be calculated; once determined, they will be the same for all panels unless the LC material or cell gap is changed. The color stability will not be as good as with faster responding LC material, but will be an improvement over non-temporal filtering. One may also just adjust the lower value, leaving the higher value constant. This may improve the viewing angle.

Temporal Patterns With Arbitrary Numbers of Frames

Figure 11A:
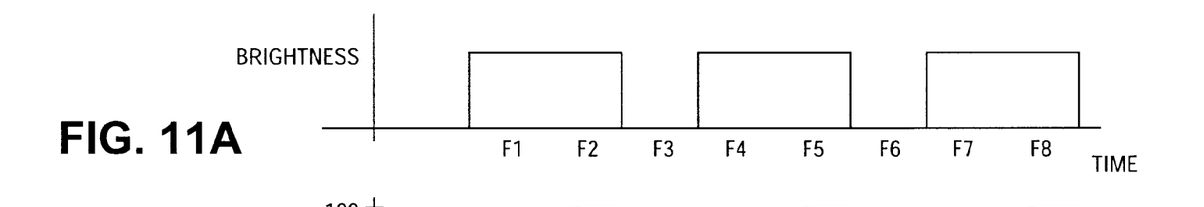
FIGS. 11A-11D show another series of curves of brightness versus time with different types of pulse trains.
Figure 11B:
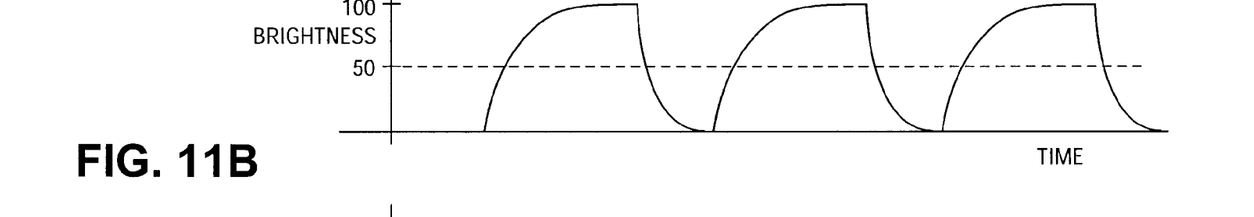
Figure 11C:
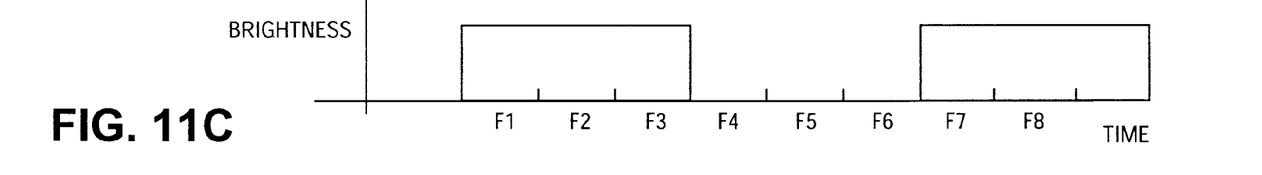
Figure 11D:
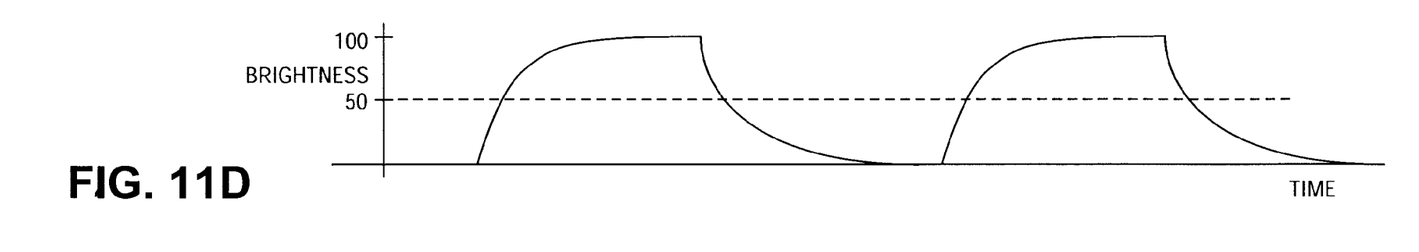

An alternative embodiment is now described that uses multiple numbers of frames to achieve the desired temporal averaging. FIGS. 11A and 11B depict a pulse train optimized for a certain liquid crystal performance, such as depicted in FIG. 10A (e.g. a slower rise time than fall time). FIGS. 11C and 11D depict a pulse train optimized for a liquid crystal having a performance curve in which the rise time and fall times are more equal.

FIG. 11A shows a pulse train in which the voltage applied to the red and blue subpixels is 100% for two frames and 0% for one frame. FIG. 11B is the resulting brightness. FIG. 11C shows a pulse train in which the voltage applied to the red and blue subpixels is 100% for three frames and 0% for three frames. FIG. 11D is resulting brightness. As can be seen in both FIGS. 11B and 11D, the liquid crystal spends most of its time at either 100% or at 0% with an average about 50%.

With either FIG. 11B or 11D, however, there is a potential for flicker in the red and blue subpixels. This potential flicker can be reduced by varying the pulse train temporally or spatially. For example, the red and blue subpixels that are near each other on the panel can be driven with the same pulse train but taken at different phase from each other. Thus, the red and blue subpixels are effectively interlaced to reduce the temporal flicker effect. The same phased pulse trains could be applied to neighboring red subpixels themselves or blue subpixels themselves to achieve the same result. Additionally, the pulse trains could be designed to minimize observable flicker in other ways: (1) by keeping the flicker frequency as high as possible; and/or (2) by designing the pattern to have less energy in lower frequency flicker components and more energy in higher frequency components.

Other embodiments of suitable pulse trains to achieve substantially the same result can be designed to match any given liquid crystal performance curve. For example, if the liquid crystal has a fast rise time and slow fall time then an appropriate pulse train may be 0% for frame 1, 100% for frame 2 and 3, and then repeat.

In general, by using arbitrary number of frames in an on/off-pattern-period, one can design pulse trains or patterns of ON's and OFF's that ultimately give the correct average pixel luminance. As discussed, separate patterns can be applied to each color. This technique may have lower temporal resolution, but judiciously applied to static images, the correct amount of emitted light from a particular pixel may be realized. In the case of scrolling text, the technique may also be applied. Since the operator in general is not attempting to read the text while it is moving, any temporal distortion of the text due to the applied pattern will not negatively impact the user's experience. The patterns can be designed to provide color correction to scrolling text.

This embodiment avoids the necessity of employing a voltage offset from the zero value as used in FIG. 10D to realize arbitrary values of subpixel luminance, thereby avoiding viewing angle and color error problems introduced with non-zero values. By using only full ON and full OFF values, the performance should be similar to RGB stripe panel performance.

Another example of a suitable pulse train is as follows: consider a four frame pattern 1,1,1,0 (or some other arbitrary pattern) that is applied to red and blue subpixels such that the flicker from each cancels each other—i.e. red and blue subpixels are out of luminance phase. Green remains unmodulated in this example. Theoretically, the output luminance will be 75% of maximum for red and blue subpixels. However, given the asymmetry of the ON and OFF response times, the response will be less than 75%, approaching 50% depending on the specific LC response time. The flicker frequency will be 15 Hz assuming a 60 Hz refresh rate, but the variations can be minimized by phasing the red and blue to cancel each other. The remaining flicker will be a fraction of the total light due to the proximity of a 100% green pixel, so the flicker effect will be attenuated.

Inversion Schemes For Effecting Temporal SPR

For LCDs which are polarity inverted to achieve zero DC voltage across the cell, there is an extra requirement when using temporal filtering. Usually the polarity is inverted every frame time, either row by row (row inversion), column by column (column inversion) or pixel by pixel (dot inversion). In the case of dot inversion, the polarity of the inversion either varies every row (1:1) or every two rows (1:2). The choice of inverting the polarity every frame is somewhat for convenience of the circuitry; polarity can be inverted every two frames without degrading the LC material. It may be desirable to invert every two frames when temporal dithering is employed so as to not get extra DC applied to the cell along edges. This could occur for the case with inversion every frame because some pixels may be switching 1 0 1 0 . . . ; if the polarity is switching every frame, then the "1" state will always be the same polarity.

Various Implementation Embodiments

Figure 12:
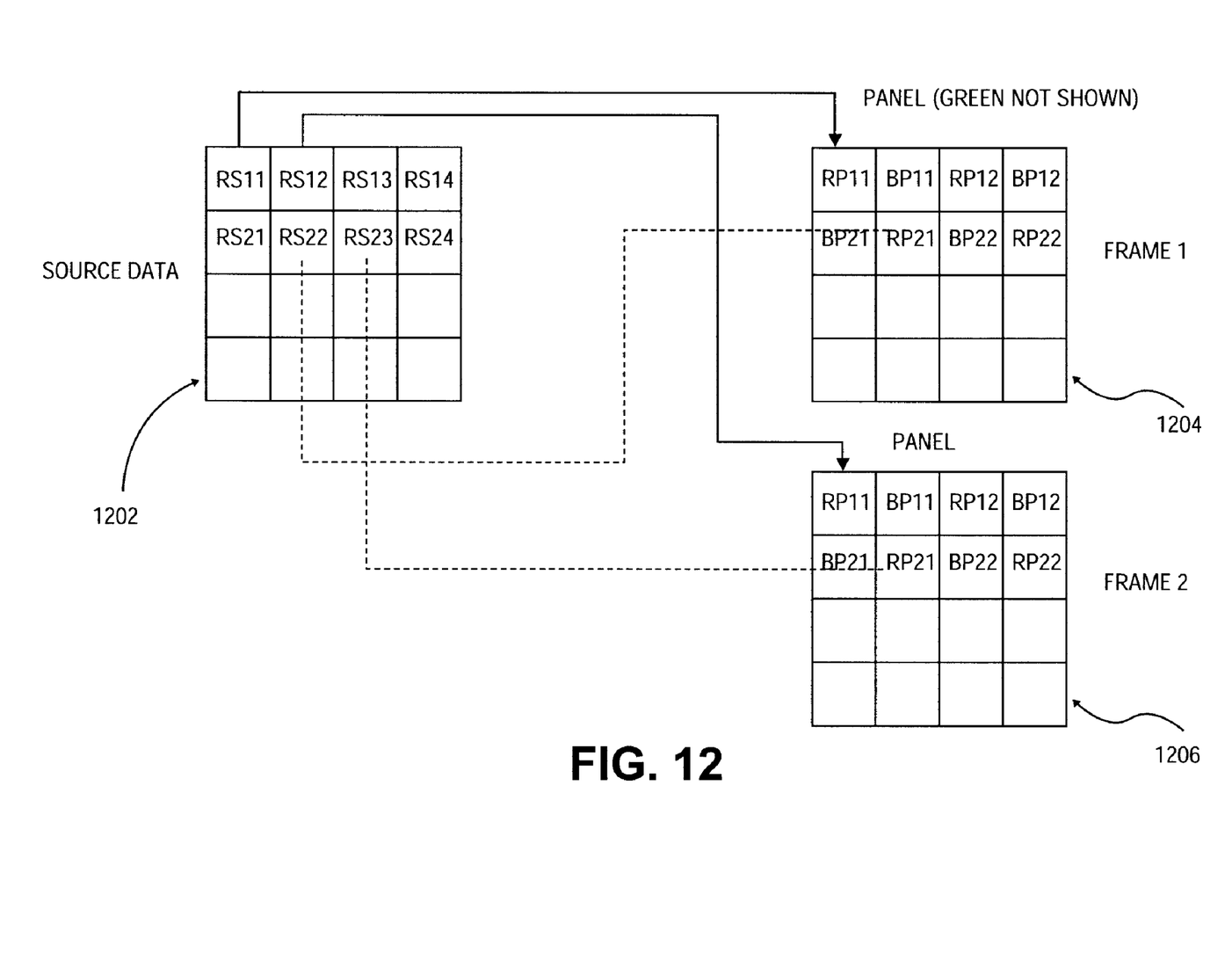
FIGS. 12 and 13 depict several embodiments of implementing temporal subpixel rendering.

One further embodiment for implementing a temporal SPR system is shown in FIG. 12. This embodiment assumes a panel comprising a subpixel repeat grouping as found in FIG. 5; however, it should be appreciated that suitable changes can be made to the present embodiment to accommodate other subpixel repeat groupings. FIG. 12 shows only the red image data; blue data would be treated similarly. As green data in the repeat grouping of FIG. 5 is mapped 1:1 from source image data, there is no need to temporally process the green data. Of course, with other subpixel repeat groupings, green data may be temporally processed as well.

FIG. 12 shows how the red data is mapped from a source image data plane 1202 to the panel data planes over frames 1204 and 1206, wherein the panel has the layout as described above. For example, RS11 maps to RP11 in Frame 1 (1204) whereas RS12 maps to RP11 in Frame 2 (1206). This mapping effectively averages the values of RS11 and RS12 (creating the equivalent of a spatial "box" filter) and outputs the result to RP11. Similarly, RS22 will be output to RP21 in Frame 1 and RS23 will be output to RP21 in Frame 2.

Figure 13:
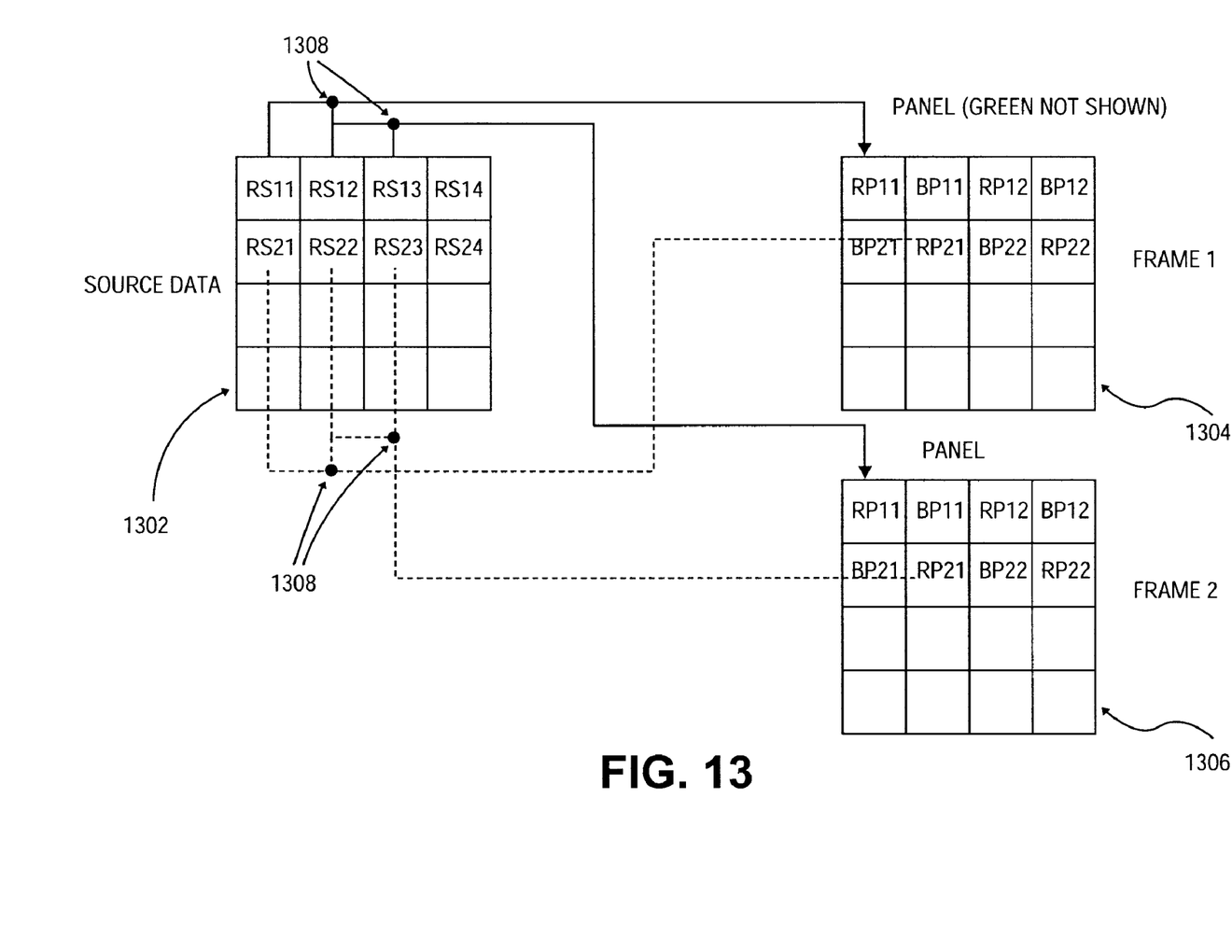

As may be seen, red source image data 1202 may be stored in the system or otherwise input into the system. This temporal averaging for red and blue data will result in the same visual appearance compared to an RGB stripe system; viewing angle and response time effects will be the same. It may also simplify the data processing for pictorial applications such as camera or TV applications. This one embodiment for remapping may work well for rendering text, but might lead to some inaccuracies in gray levels which can affect picture quality. Thus, yet another embodiment for a remapping for images, as shown in FIG. 13, is to first average the source pixels and then output to the panel. For example, RS11 and RS12 are averaged via function 1308 and outputted to RP11 in frame 1 (1304). Then RS12 and RS13 are averaged by function 1308 and outputted to RP11 in frame 2 (1306). It will be understood that function 1308 could be more than just the averaging of two pixels and could include a more complex subpixel rendering process of two or more input pixels. It will also be understood that these techniques described in FIGS. 12 and 13 apply equally to all display technologies—such as LCD, OLED, plasma, EL and other pixilated color displays. For OLED and plasma in particular, the viewing angle and response time are not an issue as it is with LCD. Therefore, the primary purpose of using temporal SPR for these technologies is to simplify the SPR processing—e.g. gamma adjustment is not required.

Use of Adaptive Filtering

Adaptive filtering can be applied to decide when to use the values directly or to average them. For edges, the R and B values are temporally averaged frame by frame, preserving the viewing angle. For non-edges, the adjacent values are first averaged and then outputted to the output subpixels. Averaging adjacent image data values for edges is not necessarily desirable because averaging would tend to blur the edge—thus making the transition less sharp. So, it may be desirable to detect where and when an edge is occurring in the image.

The averaging will make pictures slightly more accurate. Note that the averaging goes to left pixel on odd frames and right pixel on even. A typical algorithm is as follows (shown for red):

Odd Field:
IF ABS(RSn−RSn−1 )>max THEN $RP_n = RS_{n-1}$ ELSE $RP_n = (RS_n + RS_{n-1})/2$ where RS is source pixel (e.g. RED) and RP is a panel pixel and where "max" is chosen sufficient such that an edge is occurring at this point in the image with a good degree of probability.

Even Field:
IF ABS(RSn−RSn−1 )>max THEN $RP_n = RS_n$ ELSE $RP_n = (RS_n + RS_{n+1})/2$ where RS is source pixel (e.g. RED) and RP is a panel pixel and where "max" is chosen sufficient such that an edge is occurring at this point in the image with a good degree of probability.

What is claimed is:

1. A method for rendering image data on a display panel comprising at least a first set of subpixels of a first color and a second set of subpixels of a second color, the first color having a first brightness versus viewing angle performance measure and the second color having a second brightness versus viewing angle performance measure so as to introduce color error when an image is viewed on the display panel at an off-normal viewing angle, the method comprising:

receiving image data indicating an image and comprising image data values in the first and second colors;

determining a mapping from the image data values in the first and second colors in a single image data plane to the first set of subpixels and the second set of subpixels in a plurality of frames to be displayed on the display panel such that one of the first set of subpixels is substantially equal to an average of two neighboring image data values and one of the second set of subpixels is substantially equal to an average of two neighboring image data values and such that an average of a first image data value and a second image data value adjacent to the first image data value maps to a first subpixel in a first frame and an average of the second image data value and a third image data value adjacent to the second image data value maps to the first subpixel in a second frame; and outputting to the display a pulse train of on/off patterns for the first set of subpixels and the second set of subpixels over a predetermined number of frames to produce a desired average subpixel luminance.

2. The method of claim 1 wherein determining a mapping further comprises:

determining a first-color viewing angle fall-off value at each of a plurality of off-normal viewing angles using the first brightness versus viewing angle performance measure of the first color;

determining a second-color viewing angle fall-off value at each of a plurality of off-normal viewing angles using the second brightness versus viewing angle performance measure of the second color; and determining the mapping of the image data values for the first set of subpixels and the second set of subpixels such that the first-color viewing angle fall-off values and the second-color viewing angle fall-off values are proportionally matched between two preselected viewing angles.

3. The method of claim 1 wherein the display panel further comprises a third set of subpixels of a third color.

4. The method of claim 1 wherein the display panel further comprises a fourth set of subpixels of a fourth color.

5. The method of claim 1 wherein the display panel is a liquid crystal display panel.

\* \* \* \* \*